United States Patent [19]

Hattori

[11] Patent Number: 5,139,347
[45] Date of Patent: Aug. 18, 1992

[54] OIL LEAKAGE PREVENTING STRUCTURE OF A LINEAR GUIDE APPARATUS

[75] Inventor: Masaru Hattori, Gumma, Japan

[73] Assignee: Nippon Seiko Kabushiki Kaisha, Tokyo, Japan

[21] Appl. No.: 701,123

[22] Filed: May 16, 1991

[30] Foreign Application Priority Data

May 18, 1990 [JP] Japan .................................. 2-52036

[51] Int. Cl.$^5$ ............................................ F16C 29/06
[52] U.S. Cl. ........................................ 384/15; 384/45
[58] Field of Search ................. 384/15, 45, 43, 44; 464/168

[56] References Cited

U.S. PATENT DOCUMENTS

| 4,850,720 | 7/1989 | Osawa | 384/45 |
| 4,886,376 | 12/1989 | Osawa | 384/15 |

FOREIGN PATENT DOCUMENTS 64-25525 2/1989 Japan .
64-25526 2/1989 Japan .

Primary Examiner—Lenard A. Footland
Attorney, Agent, or Firm—Basile and Hanlon

[57] ABSTRACT

End caps made from synthetic resin are respectively joined to opposite ends of a slider main body of a linear guide apparatus. Each end cap having a substantially inverted U-shape has a joining end surface formed with curved passages to bring ball rolling grooves of the slider main body into communication with each other to form circulating passages. A feed oil groove is also formed in the joining end surface of the end cap to supply lubricating oil to the curved passages. In order to prevent leakage of the lubricating oil from a minute gap between the joining end surfaces of the end cap and the slider main body, a band-shaped protrusion having two parallel ridges is formed along a peripheral edge of the joining end surface of the end cap. The band-shaped protrusion is elastically deformed by a clamping force when the end cap is joined to the slider main body by fixing screws such that the minute gap between the end cap and the slider main body is filled with the deformed band-shaped protrusion.

5 Claims, 4 Drawing Sheets

OIL LEAKAGE PREVENTING STRUCTURE OF A LINEAR GUIDE APPARATUS

BACKGROUND OF THE INVENTION

1. Field of the Invention

The present invention relates to a linear guide apparatus including a guide rail and a slider linearly movable along the guide rail through a multiplicity of rolling members and, in particular, to an oil leakage preventing structure of a linear guide apparatus for preventing leakage of lubricating oil supplied to the rolling members from the slider.

2. Description of the Relevant Art

Prior art oil leakage preventing structures of a linear guide apparatus of this type are disclosed, for example, in Japanese Utility Model Laid-Open Publication No. 64-25525 (first prior art example and Japanese Utility Model Laid-Open Publication No. 64-25526 (second prior art example) which were proposed by the Applicant's company.

The linear guide apparatus in these prior art examples includes a long guide rail having axially extending ball rolling grooves formed in both side surfaces and a slider movably straddling the guide rail. The slider is composed of a slider main body and end caps respectively joined to opposite ends of the slider main body. The slider main body has ball rolling grooves respectively opposing the ball rolling grooves of the guide rail and has ball return passages respectively disposed in parallel to the ball rolling grooves. On the other hand, each of the end caps is formed with half-doughnut-shaped curved passages respectively connecting a corresponding one of the ball rolling grooves to a corresponding one of the ball return passages of the slider main body. Each of the end caps is also formed with a feed oil passage to supply lubricating oil to the curved passages. Thus, in the slider, infinitely circulating ball routes are formed by the ball rolling grooves, the ball return passages which are in parallel to the ball rolling grooves, and the curved passages which bring the ball rolling grooves into communication with the ball return passages. The slider and the guide rail are moved relative to each other in the axial direction through the rolling of the multiplicity of balls rollably inserted into the infinitely circulating ball routes.

In the end cap in the first prior art example, band-shaped recessed grooves are respectively for-med along the feed oil groove in the lands at both sides of the feed oil groove. Seal members are mounted into the band-shaped recessed grooves to prevent leakage of the lubricating oil from the feed oil groove so as to thereby prevent oil leakage to the outside.

Furthermore, in the end cap in the second prior art example, band-shaped protrusions are integrally formed on the lands at both sides of the feed oil groove to prevent leakage of the lubricating oil from the feed oil groove so as to thereby prevent oil leakage to the outside.

However, in each of the prior art examples, the oil leakage preventing structure in the end cap is only provided on the lands at both sides of the feed oil groove of the end cap. In other words, the recessed grooves are formed and the seal members are mounted therein (first prior example), or the protrusions are integrally formed (second prior example) only in an upper portion of an inverted U-shaped joining surface of the end cap.

As a result, a problem is encountered in which it is impossible to prevent the leakage of the lubricating oil from lower portions of the inverted U-shaped joining surface, that is from both side wall portions of the end cap.

SUMMARY OF THE INVENTION

It is an object of the invention to provide an oil leakage preventing structure of a linear guide apparatus which is capable of preventing leakage of lubricating oil, not only from the upper portion of the joining end surface of the end cap, but also from the lower portions thereof.

In an oil leakage preventing structure of a linear guide apparatus in the present invention, the linear guide apparatus comprises an axially extending guide rail having axial rolling member rolling grooves formed in both side surfaces, a slider main body fitted loosely and movably about the guide rail and having rolling member rolling grooves respectively opposing the rolling member rolling grooves of the guide rail and having through bores as rolling member return passages formed in parallel to the rolling member rolling grooves of the slider main body, end caps respectively joined to opposite ends of the slider main body, each of the end caps having curved passages for bringing the rolling member rolling grooves in communication with the rolling member return passages, a feed oil groove, and a multiplicity of rolling members rollably inserted into the rolling member rolling grooves. The oil leakage preventing structure includes a band-shaped protrusion integrally formed on a joining end surface of each of the end caps along a peripheral edge of the each end cap. When the joining end surface as joined with an end joining surface of the slider main body by applying a clamping force between the end cap and the slider main body, the band-shaped protrusion is deformed by the clamping force to bring the joining end surface of the end cap and the joining end surface of the slider main body into close contact each other thereby preventing leakage of lubricating oil from the feed oil groove.

The band-shaped protrusion may be formed along an outermost peripheral edge of the joining end surface of the end cap, or the band-shaped protrusion may be formed in the inside of the outermost peripheral edge of the joining end surface of the end cap and spaced from such edge by a predetermined small distance.

Furthermore, the band-shaped protrusion is not limited to one line of the band-shaped protrusion, and it may be formed in a plurality of lines disposed in parallel with one another.

In the present invention, the band-shaped protrusion integrally formed along the peripheral edge of the joining end surface of the end cap is deformed by a clamping pressure when the end cap is brought into abutment with a joining end surface of the slider main body and is clamped by small screws. A minute gap between the joining end surface of the end cap and the joining end surface of the slider main body is filled by the deformed protrusion. Even when there are geometrical errors in the roughness and the flatness of both joining end surfaces of the end cap and the slider main body, it is possible to bring both the joining end surfaces into close contact with each other over the whole peripheral areas thereof. Accordingly, the leakage of the lubricating oil can be prevented not only from the upper portion of the joining end surface of the end cap but also from the lower portions thereof.

DESCRIPTION OF THE PREFERRED EMBODIMENTS

FIGS. 1 to 5 show a first embodiment of the invention.

Figure 3:
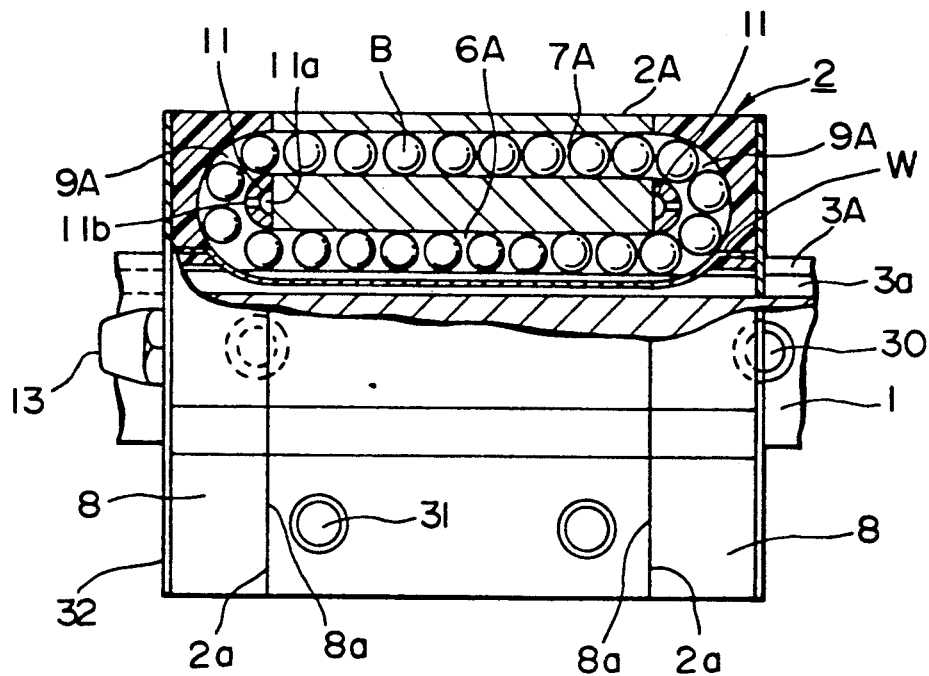
FIG. 3 is a plan view, with a part in cross section, of a linear guide apparatus of a first embodiment of the present invention.
Figure 4:
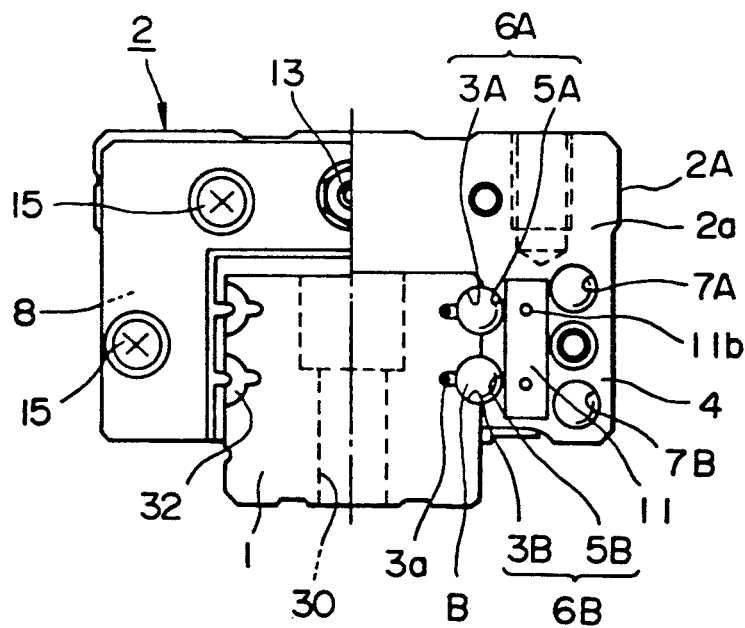
FIG. 4 is a front elevational view of the linear guide apparatus with a right half portion of the end cap of FIG. 1 being cut away.

With reference to FIGS. 3 and 4, a slider 2 having a substantially inverted U-shaped cross section is loosely and relatively movably fitted about a guide rail 1. The guide rail 1 has two pairs of long, axial ball rolling grooves 3A and 3B, each having a semicircular cross section, formed in both side surfaces thereof. A relief groove 3a of a wire-like retainer W is formed in a bottom of each of the ball rolling grooves 3A and 3B and extends along an axial direction. The wire-like retainer W prevents balls B from falling off of the slider 2.

On the other hand, the slider main body 2A has two pairs of ball rolling grooves 5A and 5B formed in the inner surfaces of both side walls 4 so that the ball rolling grooves 5A and 5B in one side wall of the slider main body 2A respectively oppose the ball rolling grooves 3A and 3B in one outer side of the guide rail 1. The opposing ball rolling grooves 3A and 5A, and 3B and 5B respectively constitute ball rolling passages 6A and 6B. In each side wall 4, the slider main body 2A has a ball return passage 7A having a circular cross section and penetrating axially in parallel to the ball rolling passage 6A and a ball return passage 7B in parallel to the ball rolling passage 6B.

Figure 1:
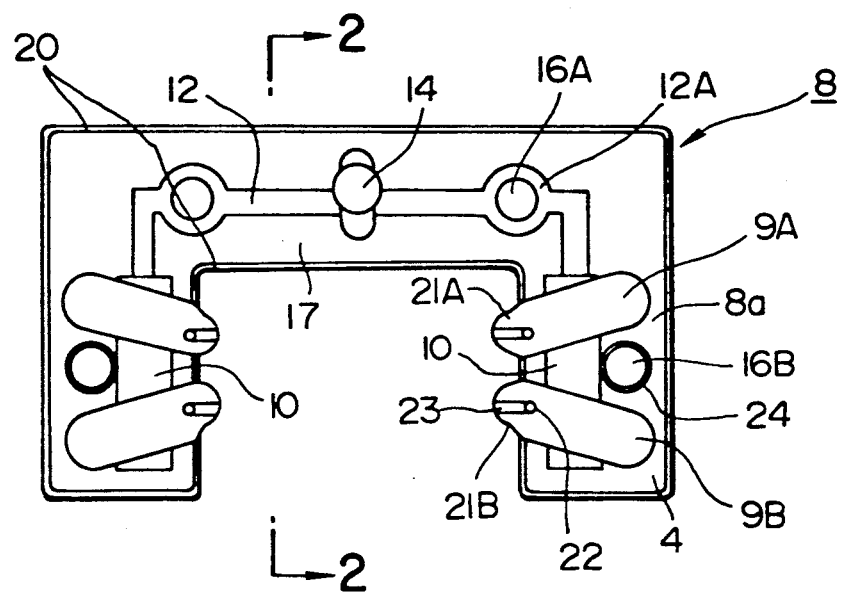
FIG. 1 is a rear surface view of an end cap in a first embodiment of the present invention.

A pair of end caps 8 which are injection mold products made from a synthetic resin are respectively joined to opposite ends of the slider main body 2A. As shown in FIG. 1, the end cap has a substantially inverted U-shaped cross section. In a 5 joining end surface 8a which is joined to a joining end surface 2a of the slider main body 2A, there are formed two pairs of semicircular-shaped curved passages 9A and 9B in both of the side walls 4. The curved passage 9A brings the ball rolling groove 6A into communication with the ball return passage 7A. The curved passage 9B brings the ball rolling groove 6A into communication with the ball return passage 7B.

The end cap 8 is formed, in each side wall 4, with a half column-shaped recessed groove 10 extending vertically across center portions of the semicircular-shaped curved passages 9A and 9B. A half cylindrical return guide 11, as shown in FIG. 3, is inserted into the half column-shaped recessed groove 10, which has an inner peripheral surface serving as an oil path groove 11a, and a through bore 11b formed between the inner peripheral surface and the outer peripheral surface. Due to the presence of the half cylindrical return guide 11, the curved passages 9A and 9B are formed in a half doughnut shape.

The end cap 8 is formed with a feed oil groove 12 which brings the pair of half column-shaped recessed grooves 10 of both the side walls 4 into communication with each other. The feed oil groove 12 is in communication with a nipple fixing bore 14 which fixedly receives a feed oil nipple 13. Through bores 16A and 16B for fixing screws 15 are also formed in the end cap 8 to attach the end cap 8 to the slider main body 2A. Among these through bores 16A and 16B, for the through bores 16A which penetrate the feed oil groove 12, spot facings are formed so that annular-shaped feed oil grooves 12A are formed in these portions to allow the lubricating oil to be supplied by flowing around the fixing screws 15.

The feed oil groove 12 which is formed in the joining end surface of the end cap 8 includes linear portions and annular portions and a flat land 17 is formed at both sides of the feed oil groove 12 along the feed oil groove 12. The flat land 17 extends over both of the side walls 4.

Figure 2:
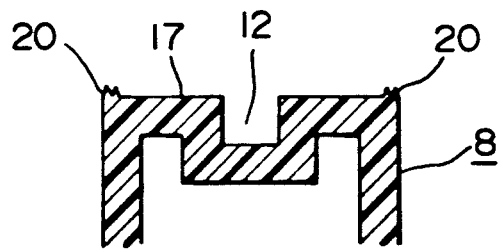
FIG. 2 is a cross sectional view generally taken along line 2—2 in FIG. 1.

A band-shaped protrusion 20 is formed along a peripheral edge of the land 17 as if the band-shaped protrusion 20 trims the land 17. The band-shaped protrusion 20 is raised slightly from the surface of the land 17 and is formed integrally with the land 17. In this embodiment, the band-shaped protrusion 20 is .formed as shown in FIG. 2 of two ridges which are acute and in parallel to each other. The band-shaped protrusion 20 or acute ridges are deformed by a clamping force of the fixing screws 15 at the time of joining of the end cap 8 to the slider main body 2A. A gap between the end cap 8 and the slider main body 2A is filled with the deformed acute ridges 20 to thereby bring the joining end surface of the end cap 8 in close contact with the joining end surface of the slider main body 2A. The band-shaped protrusion 20 can be easily formed by engraving a corresponding shape into a mold used for injection molding of the end cap 8.

Inner ends of the curved passages 9A and 9B protrude inwarldy in a semicircular shape as shown in FIG. 1 to form ball scooping protrusions 21A and 21B, respectively. The tip ends of the protrusions 21A and 21B have an acute angle and are respectively fitted into the ball rolling grooves 3A and 3B. Furthermore, wire holding bores 22 penetrate the base portions of the ball scooping protrusions 21A and 21B. Wire retainers W are held by the wire holding bores 22, with the end portions of the wire retainers W being inserted through the wire holding bores 22. Wire relief grooves 23 are respectively formed from the tip ends of the ball scooping protrusions 21A and 21B to reach the wire holding bores 22.

Furthermore, a guide projection 24 is formed at a joining side end of each fixing screw inserting bore 16B which is formed in each of the side walls 4. This guide projection 24 insures joining accuracy between the end cap 8 and the slider main body 2A, and the ball circulating passage 9A (9B; the ball rolling groove 6A (6B), and the ball return passage 70 (7B) of the slider main body 2A are brought into communication without causing a step at their joining portions.

A plurality of balls B serving as rolling members are loaded in the infinitely circulating outer formed by the ball rolling groove 6A, the curved passage 9A and the ball return passage 7A, and in the infinitely circulate route formed by the ball rolling groove 6B, the curved passage 9B and the ball return passage 7B as shown in FIG. 3.

With reference to FIGS. 3 and 4, bolt inserting bores 30 are formed in the guide rail 1 for fixing the guide rail 1 to a base table or the like, not shown, when the linear guide apparatus is to be used. Screw bores 31 are also formed in the guide rail 1 for fixing a driven member, such as a table, to the slider 2. A side seal 32 is attached to the end cap 8 to wipe the ball rolling grooves 3A and 3B of the guide rail 1 and to prevent the intrusion of foreign matter.

The operation of the above embodiment will be described.

Figure 5:
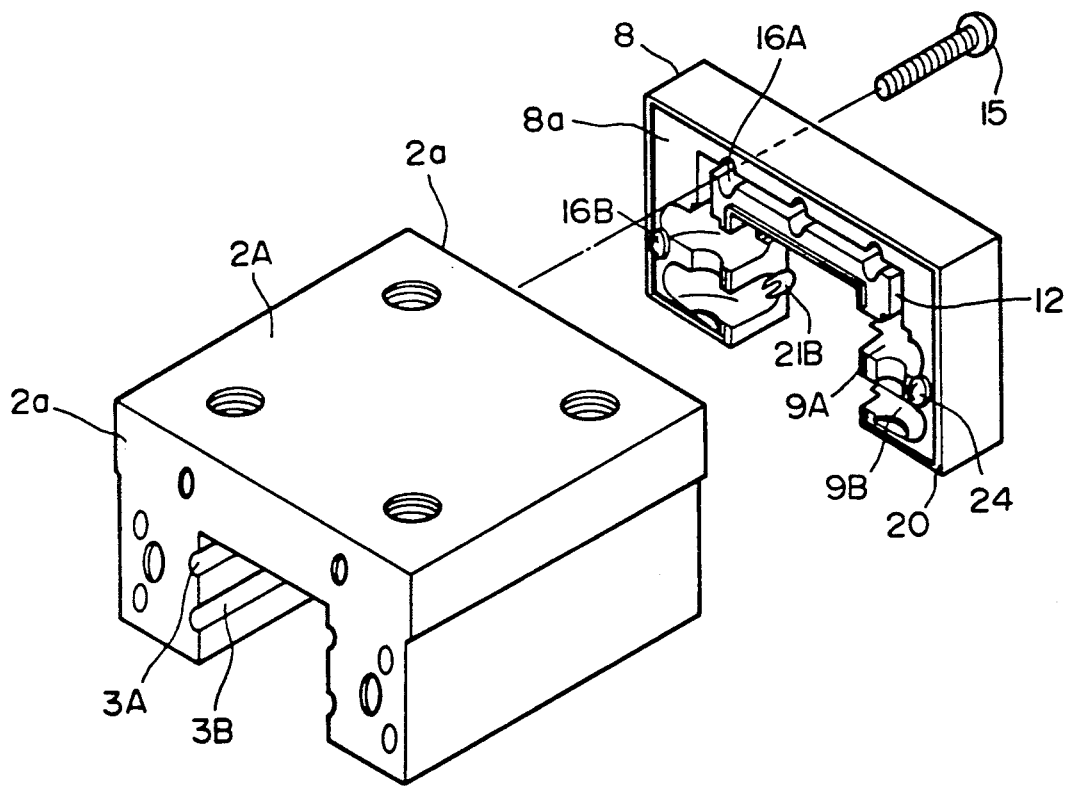
FIG. 5 is a perspective view useful in explaining the mounting of the end cap of FIG. 1.

As shown in FIG. 5, the joining end surface 8a of the end cap 8 is made to confront the joining end surface 2a of the slider main body 2A. The fixing small screws 15 are inserted into the screw inserting bores 16A and 16B and tightened. As a result, the end cap 8 is pressed against the slider main body 2A. Then, the band-shaped protrusion 20 having two ridges which are integrally formed along the peripheral edge of the end cap 8 is elastically deformed, and a minute gap formed between both the joining end surfaces due to roughness of the joining end surfaces and any error in the flatness of the members is filled by the deformed band-shaped protrusion 20. Consequently, the leakage of the lubricating oil supplied from the feed oil nipple 13 to the feed oil groove 12 is completely prevented.

When the slider 2 is moved in an axial direction on the guide rail i, the balls B inserted into the ball rolling grooves 6A (6B) are rolled with the movement of the slider 2, and the balls B are moved with respect to the slider 2 in a direction opposite to the direction of movement of the slider 2. When the balls B reach an end of the slider 2, the balls B are guided by the ball scooping projection 21A (21B) provided on the end gap 8 and the direction of movement of the balls B is changed. Further, the balls B make a U-turn along the curved passage 9A (9Ba). Subsequently, the balls B pass through the ball return passage 7A (7B) and again make a U-turn along the curved passage 9A (9Ba) of the end cap 8 at the opposite side and are returned to the ball rolling grooves 6A (6B). In this manner, the balls B are circulated while continuing rolling and movement.

At this time, the lubricating oil in the feed oil groove 12 is supplied to the curved passages 9A and 9B through the oil pass groove 11a and the through bore 11b of the return guide 11 to insure the smooth rolling of the balls B.

In this embodiment, the band-shaped protrusion 20 formed along the peripheral edge of the joining end surface 8a of the end cap 8 is deformed and the minute gap between the joining end surface 2a of the slider main body 2A and the joining end surface 8a of the end cap 8 is filled with the deformed protrusion 20 to bring both of the joining end surfaces into close contact with each other. Accordingly, the leakage of the lubricating oil can be prevented not only from the upper portion of the joining end surface of the end cap 8 but also from the lower portions of the joining end surface. Thus, the feeding of the lubricating oil to the curved passages 9A and 9B can be insured. Furthermore, since the acute ridges of the band-shaped protrusion 20 are collapsed or crushed by the joining end surface (grooved surface) of the slider main body 2A and both of the joining end surfaces are brought into close contact with each other, even when the roughness of the ground surface is unsatisfactory, the close contact of both of the joining end surfaces can be insured.

Figure 6:
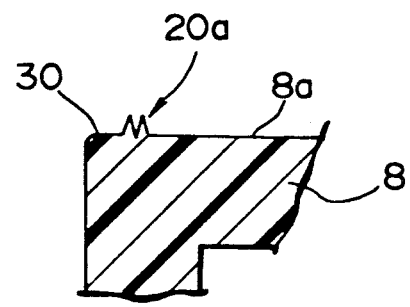
FIG. 6 is an enlarged, partial, cross sectional view of a main part of an end cap of a second embodiment of the present invention.

FIG. 6 shows a second embodiment.

In this embodiment, as contrasted to the first embodiment, a band-shaped protrusion 20 is not formed along the outermost peripheral edge of the joining end surface 8a. Instead, the band-shaped protrusion 20a is formed at the inside of a flat portion 30 which is formed along the outermost peripheral edge of the joining surface 8a. Owing to the protrusion of the flat portion 30 at the outermost peripheral edge portion, it is possible to a considerable extent to prevent the ridges of the band-shaped protrusion 20a from being crushed or damaged when the band-shaped protrusion 20a collides with other components at the time of removing the end cap 8 from an injection molding machine.

Figure 7:
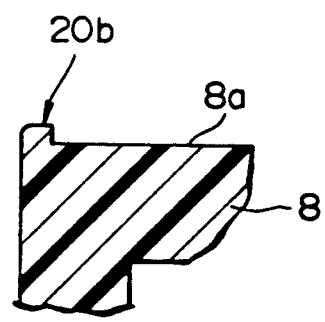
FIG. 7 is an enlarged, partial, cross sectional view of a main part of an end cap of a third embodiment of the present invention.

FIG. 7 shows a third embodiment of the present invention.

In this embodiment, a band-shaped protrusion 20b formed along the peripheral edge of the joining surface 8a has a flat upper surface formed in one line. As compared with the first and second embodiments in which the band-shaped protrusion has acute ridges, the protrusion 20b is not so easily deformed. However, similar to the second embodiment, the advantage is also provided in that it is difficult for the protrusion 20b to be crushed when it collides with other components at the time of removing the end cap from an injection molding machine.

The attaching position of the feed oil nipple 13 is not limited to the illustrated position at the front center of the end cap 8 and, in some cases, the feed oil nipple 13 may be attached to a lateral side of the end cap 8 by forming a nipple attaching bore in the lateral side of the end cap 8. Even in such a case, the present invention can be applied very effectively.

While the balls B are used as rolling members in the above embodiments, the present invention is also applicable to the case in which rollers are used as the rolling members.

As described in the foregoing, the present invention provides the following advantages. Since the band-shaped protrusion is integrally formed along the peripheral edge of the joining end surface of the end cap, which is an injection mold product of a synthetic resin, and since the band-shaped protrusion is deformed by the clamping force at the time of screwing the end cap to the joining end surface of the slider main body so that the minute gap between both of the joining end surfaces is filled with the deformed band-shaped protrusion, the lubrication oil does not leak from the upper and the lower portions of the joining end surface of the end cap. Accordingly, the lubricating oil is supplied without fail to the rolling members and a smooth operation and long life of the linear guide apparatus can be insured.

What is claimed is:

1. A linear guide apparatus comprising:
   a guide rail extending in an axial direction and having axial rolling member rolling grooves formed in both side surfaces thereof;
   a slider main body loosely and movably fitted about the guide rail, the slider main body having rolling member rolling grooves respectively opposing the rolling member rolling grooves of the guide rail and having through bores acting as rolling member return passages formed in parallel to the rolling member rolling grooves of the slider main body;

end caps respectively joined to opposite ends of the slider main body, each of the end caps having curved passages for bringing the rolling member rolling grooves of the slider main body into communication with the rolling member return passages, and having a feed oil grooves for supplying lubricating fluid to the curved passages; and a plurality of rolling members rollably inserted into the rolling member rolling grooves;

each of the end caps being made from a synthetic resin and including a band-shaped protrusion integrally formed on a joining end surface thereof along a peripheral edge of each end cap, each band-shaped protrusion being deformed by a calming force when the joining end surface of each end cap is joined with a joining end surface of the slider main body to thereby bring the joining end surface of each end cap and the slider main body into close contact with each other to prevent the leakage of the lubricating fluid from the feed oil groove to the outside.

2. The linear guide apparatus according to claim 1 wherein the band-shaped protrusion is formed along an outermost peripheral edge of the joining end surface of each end cap.

3. The linear guide apparatus according to claim 2 wherein the band-shaped protrusion includes a plurality of ridges formed in parallel to each other.

4. The linear guide apparatus according to claim 1 wherein the band-shaped protrusion is formed at the inside of a flat portion which is formed along an outermost peripheral edge of the joining end surface of each end cap.

5. The linear guide apparatus according to claim 4 wherein the band-shaped protrusion includes a plurality of ridges formed in parallel to each other.

* * * * *